United States Patent
Lin et al.

(10) Patent No.: US 12,468,483 B2
(45) Date of Patent: Nov. 11, 2025

(54) FLASH MEMORY CONTROLLER, STORAGE DEVICE, AND ADDRESS MAPPING METHOD OF FLASH MEMORY CONTROLLER

(71) Applicant: Silicon Motion, Inc., Hsinchu County (TW)

(72) Inventors: Chien-Ting Lin, Hsinchu County (TW); Wei-Chi Hsu, Taoyuan (TW); Chin-Hung Liu, Hsinchu County (TW)

(73) Assignee: Silicon Motion, Inc., Hsinchu County (TW)

( * ) Notice: Subject to any disclaimer, the term of this patent is extended or adjusted under 35 U.S.C. 154(b) by 53 days.

(21) Appl. No.: 18/581,353

(22) Filed: Feb. 19, 2024

(65) Prior Publication Data

US 2024/0377984 A1  Nov. 14, 2024

(30) Foreign Application Priority Data

May 10, 2023  (TW) .................................. 112117298

(51) Int. Cl.
  *G06F 3/06*  (2006.01)
(52) U.S. Cl.
  CPC .......... *G06F 3/0656* (2013.01); *G06F 3/0604* (2013.01); *G06F 3/0679* (2013.01)
(58) Field of Classification Search
  CPC ........ G06F 12/0246; G06F 2212/1016; G06F 2212/1044; G06F 2212/7201; G06F 2212/7203; G06F 3/0604; G06F 3/061; G06F 3/064; G06F 3/0656; G06F 3/0679
  See application file for complete search history.

(56) References Cited

U.S. PATENT DOCUMENTS

| | | | |
|---|---|---|---|
| 2015/0106556 A1 | 4/2015 | Yu | |
| 2016/0196208 A1* | 7/2016 | Choi | G06F 12/0646 711/171 |
| 2021/0208798 A1* | 7/2021 | Fu | G06F 3/0655 |

FOREIGN PATENT DOCUMENTS

| | | |
|---|---|---|
| CN | 101097551 A | 1/2008 |
| TW | 201403318 A | 1/2014 |
| TW | 1502345 B | 10/2015 |
| TW | 201719437 A | 6/2017 |
| TW | 1636363 B | 9/2018 |

(Continued)

*Primary Examiner* — Jane W Benner
(74) *Attorney, Agent, or Firm* — Winston Hsu

(57) ABSTRACT

A flash memory controller includes a specific buffer and a processor. The specific buffer allocates a cache space. The processor receives a specific host address sent from the host device, reads and loads a corresponding address pointer mapping table from the flash memory into the cache space according to address information pointed by a specific address pointer linker, determines a specific address pointer corresponding to the specific host address from the corresponding address pointer mapping table according to the specific host address, reads and loads a corresponding address mapping table from the flash memory into the cache space according to address information pointed by a specific address pointer corresponding to the specific host address, and finds a specific flash memory address from the corresponding address mapping table according to the specific host address to perform an access operation in response to the found specific flash memory address.

17 Claims, 3 Drawing Sheets

(56) References Cited

FOREIGN PATENT DOCUMENTS

TW 202026900 A 7/2020
TW 202238397 A 10/2022

* cited by examiner

FLASH MEMORY CONTROLLER, STORAGE DEVICE, AND ADDRESS MAPPING METHOD OF FLASH MEMORY CONTROLLER

BACKGROUND OF THE INVENTION

1. Field of the Invention

The invention relates to a flash memory control mechanism, and more particularly to a flash memory controller, a storage device, an address mapping method of the flash memory controller.

2. Description of the Prior Art

Generally speaking, a conventional method usually stores all the information data of all the mapping relations between logical addresses and physical address in a cache buffer space within a flash memory controller to make all the information data can be resident in the flash memory controller. For the users, this may rapidly find and update a corresponding physical address in the cache buffer space no matter what logical address is to be accessed, however, inevitably the size of the cache buffer space is limited. Due to the circuit costs, the size of the cache buffer space in a flash memory controller cannot be significantly scaled so that actually the flash memory controller cannot make all the information data of all the mapping relations be resident in its cache buffer space. For example, due to that the internal cache space may be not enough and the firmware design of the flash memory controller should be also considered, the currently developed convention flash memory controller merely supports at most four Terabytes (4 TB) physical memory address space, and it cannot support a lager physical memory address space such as 8 TN, 16 TB, or above.

SUMMARY OF THE INVENTION

Therefore one of the objectives of the invention is to provide a flash memory controller, an address mapping method used in the flash memory controller, and a storage device, to solve the above-mentioned problems.

According to embodiments of the invention, a flash memory controller, coupled between a host device and a flash memory, is disclosed. The flash memory controller comprises a specific buffer and a processing circuit. The specific buffer is used for allocating a cache space to cache and temporarily store data stored by the flash memory externally coupled to the flash memory controller. The processing circuit is coupled to the specific buffer, and is used for receiving a specific host address from the host device, reading and loading a corresponding address pointer mapping table from the flash memory into the cache space of the specific buffer according to address information pointed by a specific address pointer linker corresponding to the specific host address, determining a specific address pointer corresponding to the specific host address from the corresponding address pointer mapping table according to the specific host address, reading and loading a corresponding address mapping table from the flash memory into the cache space of the specific buffer according to address information pointed by the specific address pointer, and for finding and obtaining a specific flash memory address from the corresponding address mapping table according to the specific host address so as to perform an access operation according to the found specific flash memory address.

According to the embodiments, an address mapping method used by a flash memory controller which is to be coupled between a host device and a flash memory is disclosed. The method comprise: providing a specific buffer to allocate a cache space to cache and temporarily store data stored by the flash memory which is externally coupled to the flash memory controller; providing a processing circuit coupled to the specific buffer; using the processing circuit to receive a specific host address from the host device; reading and loading a corresponding address pointer mapping table from the flash memory into the cache space of the specific buffer according to address information pointed by a specific address pointer linker corresponding to the specific host address; determining a specific address pointer corresponding to the specific host address from the corresponding address pointer mapping table according to the specific host address; reading and loading a corresponding address mapping table from the flash memory into the cache space of the specific buffer according to address information pointed by the specific address pointer; and, finding and obtaining a specific flash memory address from the corresponding address mapping table according to the specific host address so as to perform an access operation according to the found specific flash memory address.

According to the embodiments, a store device coupled to a host device is disclosed. The storage device comprises a flash memory and the above-mentioned flash memory controller. The flash memory controller is coupled between the host device and the flash memory, and it comprises a time sharing buffer and a processing circuit. The time sharing buffer is used for allocating a cache space to cache and temporarily store data stored by the flash memory. The processing circuit is coupled to the time sharing buffer, and used for: receiving a specific host address from the host device; reading and loading a corresponding address pointer mapping table from the flash memory into the cache space of the time sharing buffer according to address information pointed by a specific address pointer linker corresponding to the specific host address; determining a specific address pointer corresponding to the specific host address from the corresponding address pointer mapping table according to the specific host address; reading and loading a corresponding address mapping table from the flash memory into the cache space of the time sharing buffer according to address information pointed by the specific address pointer; and, finding a specific flash memory address from the corresponding address mapping table according to the specific host address so as to perform a read operation according to the found specific flash memory address.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
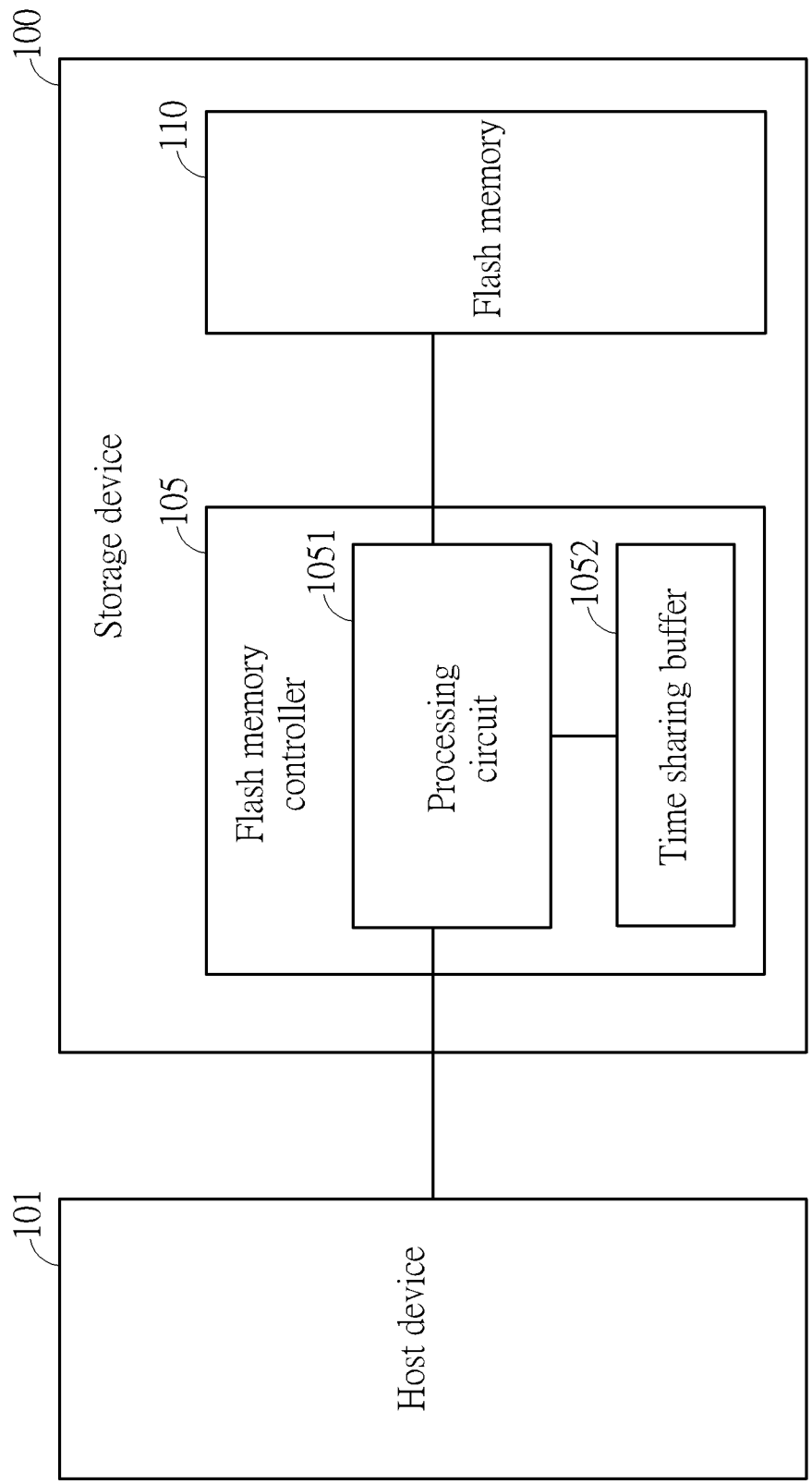
FIG. 1 is a block diagram of a storage device according to an embodiment of the invention.

The invention aims at providing an address mapping conversion technical solution of a storage device (or a flash memory controller) which extends a single-layer logical-physical address mapping relation into at least two-layer above address mapping relations. The storage device (or the flash memory controller) equivalently uses at least two-layer above address mapping relation to divide all address mapping relations into a plurality of portions or segments, to cache and temporarily store the address mapping relation(s) to be used within the flash memory controller and storing the address mapping relation(s) not to be used within the flash memory, and to correctly read and load the address mapping relation(s) to be used into a cache space within the flash memory controller, so as to convert a host address into a flash memory address to correctly perform a specific access operation such as a data read operation (but not limited) or convert a flash memory address into a host address to perform other access operation(s), wherein the cache space for example is a static random access memory having a faster access speed (but not limited). The address mapping relation can be also called as an H2F (host-to-flash) address mapping relation, a host address may be called as a logical address, and a flash memory address may be called as a physical address.

The invention provides the at least 2-layer above address mapping technical solution to make a storage device be able to implement a larger memory capacity as well as merely increasing a slight portion of flash memory read time when reading and loading the address mapping relation. Thus, this can achieve an ideal result of the operation speed of the access operation(s) or disk testing such as CDM (Crystal Disk Mark)) operation not becoming slower as well as supports a larger memory space.

In comparison, the conventional method is to make all the H2F address mapping relations be stored and resident within a conventional flash memory controller. For a user, even though such conventional method may rapidly find a corresponding physical address when the user controls the storage method to read/write a logical address, however, an inevitable drawback is that the circuit scalability of the conventional method will be limited due to the internal storage capacity size of the flash memory controller cannot be increased significantly since of the circuit costs. That is, the flash memory controller may merely stores the data amounts of the address mapping relations having a limited size. Since the internal storage capacity of the flash memory controller is not enough and the circuit structure of firmware design may be needed to be considered, the conventional method may merely support and provide a physical memory address space size having at most four Terabytes (4 TB). In contrast to the conventional method, the multi-layer (e.g. 2-layer or above 2-layer) address mapping conversion technical solution provided by the embodiments of the invention can be employed to effectively solve the problems of the conventional method as well as can support a larger physical memory address space such as 8 TB, 16 TB, or other larger address spaces.

FIG. 1 is a block diagram of a storage device 100 such as a flash memory-based storage device according to an embodiment of the invention. As shown in FIG. 1, the storage device 100 comprises a flash memory controller 105 and a flash memory 110. The flash memory 110 for example comprises one or more flash memory chips. The storage device 100 is for example externally coupled to a host device 101. The flash memory controller 105 is coupled to the flash memory 110 and is used for control and access the flash memory 110n according to an access command sent by the host device 101. In addition, the flash memory controller 105 comprises a processing circuit 1051 and a specific buffer 1052 such as a time sharing buffer (TSB). The time sharing buffer 1052 for example is located at or allocated by a static random access memory or a cache memory in the flash memory controller 105. The time sharing buffer 1052 is used to allocate a cache space to cache and temporarily store/buffer data stored by the flash memory 110 which is externally coupled to the flash memory controller 105. The processing circuit 1051 for example comprises a processor (single-core or multi-core), other hardware circuit(s) such as an output/input circuit for outputting data into the flash memory 110 or receiving information of the flash memory 110, and/or firmware circuit(s), and so on.

In the embodiments of the invention, the flash memory controller 105 employs multi-layer (such as 2-layer or 2-layer above) address mapping technical solution to perform the mapping conversion of logical address(es) to physical address(es). in one embodiment, for the 2-layer address mapping technical solution executing the address mapping conversion of one logical address to one physical address, for example the flash memory controller 105 (or the processing circuit 1051) receives a specific host address (i.e. a logical address) from the host device 101, reads a corresponding address pointer mapping table from the flash memory 110 to load the corresponding address pointer mapping table into the cache space of the time sharing buffer 1052 according to address information pointed by a specific address pointer linker corresponding to the specific host address, then determines a specific address pointer corresponding to the specific host address from the corresponding address pointer mapping table according to the specific host address, then reads a corresponding address mapping table from the flash memory 110 to load the corresponding address mapping table into the cache space of the time sharing buffer 1052 according to address information pointed by the specific address pointer, and then finds a specific flash memory address from the corresponding address mapping table according to the specific host address to perform an access operation based on the found specific flash memory address. An address pointer linker is an H2F address pointer linker, and an address pointer is an H2F address pointer. In other words, the flash memory controller 105 (or the processing circuit 1051) is arranged to find an H2F address pointer linker from one H2F address pointer linker mapping table, then to point to and find an H2F address pointer mapping table according to the found H2F address pointer linker, then to find an H2F address pointer from the H2F address pointer mapping table, then to point to and find an H2F address mapping table according to the found H2F address pointer, and finally to find a corresponding physical address from the H2F address mapping table. The H2F address pointer linker mapping table for example comprises a number N of H2F address pointer linkers, e.g. 32 H2F address pointer linkers. Since the occupied data amount is very small (for example the 32 H2F address pointer linkers may mere need to occupy the data amount of 128 bytes), the number N of H2F address pointer linkers, e.g. 32 H2F address pointer linkers, can be resident in and stored by the cache space of the time sharing buffer 1052. The number N of H2F address pointer linkers can respectively correspond to and are mapped into N parts/segments/ portions of a memory space which can be allocated by the flash memory 110, e.g. a maximum memory space.

In other words, to reduce the circuit cost requirement of the time sharing buffer 1052, the flash memory controller 105 (or the processing circuit 1051) can merely cache and temporarily store a part or portion of H2F address pointers into the cache space allocated by the time sharing buffer 1052 while the other parts (or the other portions) of H2F address pointers are still stored in the flash memory 110. When the flash memory controller 105 cannot find the H2F address pointer corresponding to the host address from the cache space, the flash memory controller 105 reads and loads the other parts/portions of H2F address pointers from the flash memory 110. In other words, by making the number N of H2F address pointer linkers be resident in and stored within the cache space without storing all the H2F address pointers within the cache space, the flash memory controller 105 merely needs to read and load the information of the H2F address pointer mapping table from the flash memory 110 according to one physical address pointed by the found H2F address pointer linker, and then reads and loads the information of an H2F address mapping table from the flash memory 110 according to another physical address pointed by the H2F address pointer found from the H2F address pointer mapping table, so as to determine a physical address from the H2F address mapping table.

In addition, the may periodically or non-periodically update information of a portion of H2F address pointers cached and temporarily stored in the cache space of the time sharing buffer 1052, to improve the whole data access performance.

By using the above-mentioned 2-layer address mapping operation, the flash memory controller 105 can dynamically configure the size of the cache space allocated by the time sharing buffer 1052 and configure the size of the physical address memory space needed by one H2F address pointer mapping table and the size of the physical address memory space needed by one H2F address mapping table in response to the different requires of different customers or users as far as possible, to meet the actual requirements as well as reduce the size of the allocated cache space as far as possible to reduce circuit costs.

For example (but not limited), one or each H2F address pointer may be arranged to store, point to, or indicate the information of one physical address of a corresponding H2F address mapping table by using the data size of four byte (i.e. 4 B, 'B' indicates a unit of one bye). In this example, if the storage space size needed by one H2F address pointer mapping table is 128 KB (Kilobytes), then one H2F address pointer mapping table can comprise total 32K H2F address pointers since 128 KB divided by 4 B is equal to 32K. If one H2F address mapping table corresponding to and pointed by one H2F address pointer can map into a storage space having the size of 128 Megabytes (MB), then the total 32K H2F address pointers can map into the data amount of 4 TB since the value 32K multiplied by 128 MB is equal to 4 TB.

For the single-layer mapping, when the time sharing buffer 1052 needs to allocate the required storage space 128 KB when the information of all the 32K H2F address pointers of the H2F address pointer mapping table is to be cached in the cache space of time sharing buffer 1052. The flash memory controller 105 (or the processing circuit 1051) can directly look up and find the address of one H2F address mapping table corresponding to one H2F address pointer from the cached H2F address pointer mapping table, reading and loading the information of the H2F address mapping table from the flash memory 110 according to the found address so as look up and find a flash memory address from the loaded H2F address mapping table.

For the 2-layer above mapping, the flash memory controller 105 (or the processing circuit 1051) can support the address mapping of the flash memory space which is larger than 4 TB by using the above-mentioned H2F address pointer linkers.

In addition, in one embodiment, in a condition of supporting the same size of the flash memory space such as 4 TB, the flash memory controller 105 (or the processing circuit 1051) may increase the total number of H2F address pointers. For example, the design of total number 32K of H2F address pointers may be modified as the design of total number 64K of H2F address pointers, i.e. the total number of H2F address pointers is doubled, so that the size of the storage space required and used by one H2F address mapping table used for storing H2F addresses can reduced to half of the originally required storage space, i.e. the original value 128 MB can be decreased as 64 MB. In this situation, the size of the storage space required and used by one H2F address pointer mapping table used for storing 64K H2F address pointers is also doubled from 128 KB into 256 KB since the value 64K multiplied by 4 B is equal to 256 KB. In this embodiment, if the time sharing buffer 1052 is able to allow allocating the cache space having 256 KB, then all the information of the 64K H2F address pointers can be simultaneously resident in and cached in the cache space. Instead, if the time sharing buffer 1052 merely allows allocating the storage space having 128 KB, then another static random access memory may be used to implement the memory space having 256 KB. Alternatively, the time sharing buffer 1052 allocating the storage space having 128 KB may be used with the provided another static random access memory to respectively store the information of different portions of H2F address pointers.

In the embodiment of the invention, if the flash memory controller 105 (or the processing circuit 1051) needs to support a larger-size flash memory space such as 8 TB, 16 TB, or 16 TB above, then the flash memory controller 105 (or the processing circuit 1051) can reduce the size of one storage space required by one H2F address mapping table storing multiple H2F addresses from for example 128 MB into hale of 128 MB, i.e. 64 MB, with employing the design of one H2F address pointer mapping table having 128K H2F address pointers. That is, in this situation, it may be needed to use a memory space having the size of 512 KB, i.e. 128K*4 B=512 KB, to cache all the information of one H2F address pointer mapping table, so as to make all the information of all 128K H2F address pointers be simultaneously resident in the cache space. However, in practice, the cache space of the time sharing buffer 1052 may be further used to store information of variables such as variable information of read/write (R/W) buffers, system information, cache information and/or garbage collection information, and so on, in addition to allocating to cache and temporarily store the information of H2F address pointers. Thus, in one embodiment, if the cache space of the time sharing buffer 1052 cannot allocate a larger memory space such as 512 KB to make all the data information of all the H2F address pointers such as 128K H2F address pointers be resident and cached in the cache space, then the flash memory controller 105 (or the processing circuit 1051) can employ the above-mentioned two-layer (or two-layer above) address mapping technical solution to reduce circuit costs as well as maintain the performance of the system access/read speed. That is, when a cache space of a time sharing buffer (or the memory space of the static random access memory) in a flash memory device under a certain flash memory product specification cannot support a larger memory space or it is not enough, the above-mentioned two-layer (or two-layer above) address mapping technical solution can be employed to solve the problems so as to achieve reduction of circuit costs as well as maintain the system access performance.

In one embodiment, for an example of supporting a flash memory storage space having 16 TB (i.e. 16384 GB (Gigabyte)) in a condition that all H2F address information of one H2F address mapping table can be mapped into a physical address memory space having 64 MB, it may need total 256K H2F address mapping tables, i.e. the value 16384 GB divided by 64 MB is equal to 256K, to indicate the physical address mapping relation of the memory space size 16384 GB. The physical addresses of each H2F address mapping table is pointed by a corresponding H2F address pointer which needs the memory space of 4 B for implementation. Accordingly, it may need total the memory space of 1024 KB, i.e. the value 256K multiplied by 4 B is equal to 1024 KB, to simultaneously and completely store all the information of all the 256K H2F address pointers. For example (but not limited), the size of the total memory space of the time sharing buffer 1052 allocated for the flash memory controller 105 (or the processing circuit 1051) is only 1024 KB=1 MB, and the total memory space of the time sharing buffer 1052 is not dedicated for storing all the information of all the H2F address pointers. For instance, the time sharing buffer 1052 may merely allocate a memory space of 512 KB at most as the cache space which can be used by the firmware of the flash memory controller 105 (or the processing circuit 1051) to temporarily store the information of the H2F address pointers. Accordingly, in this example, all the information of all the H2F address pointers cannot be simultaneously stored, cached, and resident in the cache space of the time sharing buffer 1052. In this situation, the flash memory controller 105 (or the processing circuit 1051) can equivalently divide the allocated/specified physical address memory space (e.g. 16 TB) of the flash memory under this product specification into multiple parts, portions, or segments, and can manage the divided parts/portions/segments. For example, N may be two times, three times, or many times larger than two. N for example (but not limited) may be configured to be equal to 32. The divided N portions may respectively correspond to the H2F address pointer linkers having the number N in one H2F address pointer linker mapping table, and each portion indicates a corresponding physical address memory space size which is equal to 16384 GB divided by N, i.e. the physical address memory space size of 512 GB which is calculated by dividing 16384 GB with 32. Each portion respectively corresponds to a different H2F address pointer linker. The flash memory controller 105 (or the processing circuit 1051) is arranged to cache and temporarily store all the information of the N H2F address pointer linkers in cache space, which can be allocated by the time sharing buffer 1052, as the resident data. When determining a specific H2F address pointer linker corresponding to a host address, the flash memory controller 105 (or the processing circuit 1051) is arranged to read and load the information of one H2F address pointer mapping table pointed by and corresponding to the specific H2F address pointer linker from the flash memory 110 into the cache space of the time sharing buffer 1052, and the loaded H2F address pointer mapping table comprises the information of multiple H2F address pointers which may merely the data occupy amount 128 KB, i.e. 1024 KB*4 B/32=128 KB. Since the data amount 128 KB is significantly smaller than 1024 KB, the N H2F address pointer linkers and the loaded H2F address pointer mapping table can be simultaneously cached and temporarily stored in the cache space of the time sharing buffer 1052.

That is, the flash memory controller 105 (or the processing circuit 1051) uses an H2F address pointer linker to indicate and store a portion of the physical address space. For example (but not limited), the flash memory controller 105 (or the processing circuit 1051) may divide the maximum cache space, which can be allocated by the flash memory controller 105, into 32 portions each being used to indicate a corresponding different physical address memory space having the size of 512 GB since the value 16384 GB divided by 32 is equal to 512 GB and each portion corresponding to a different H2F address pointer linker. For instance, a first H2F address pointer linker PL_0 indicates the memory space ranging from 0 to 512 GB. A second H2F address pointer linker PL_1 indicates another memory space ranging from 512 GB to 1024 GB; other descriptions are similar and not detailed.

Figure 2:
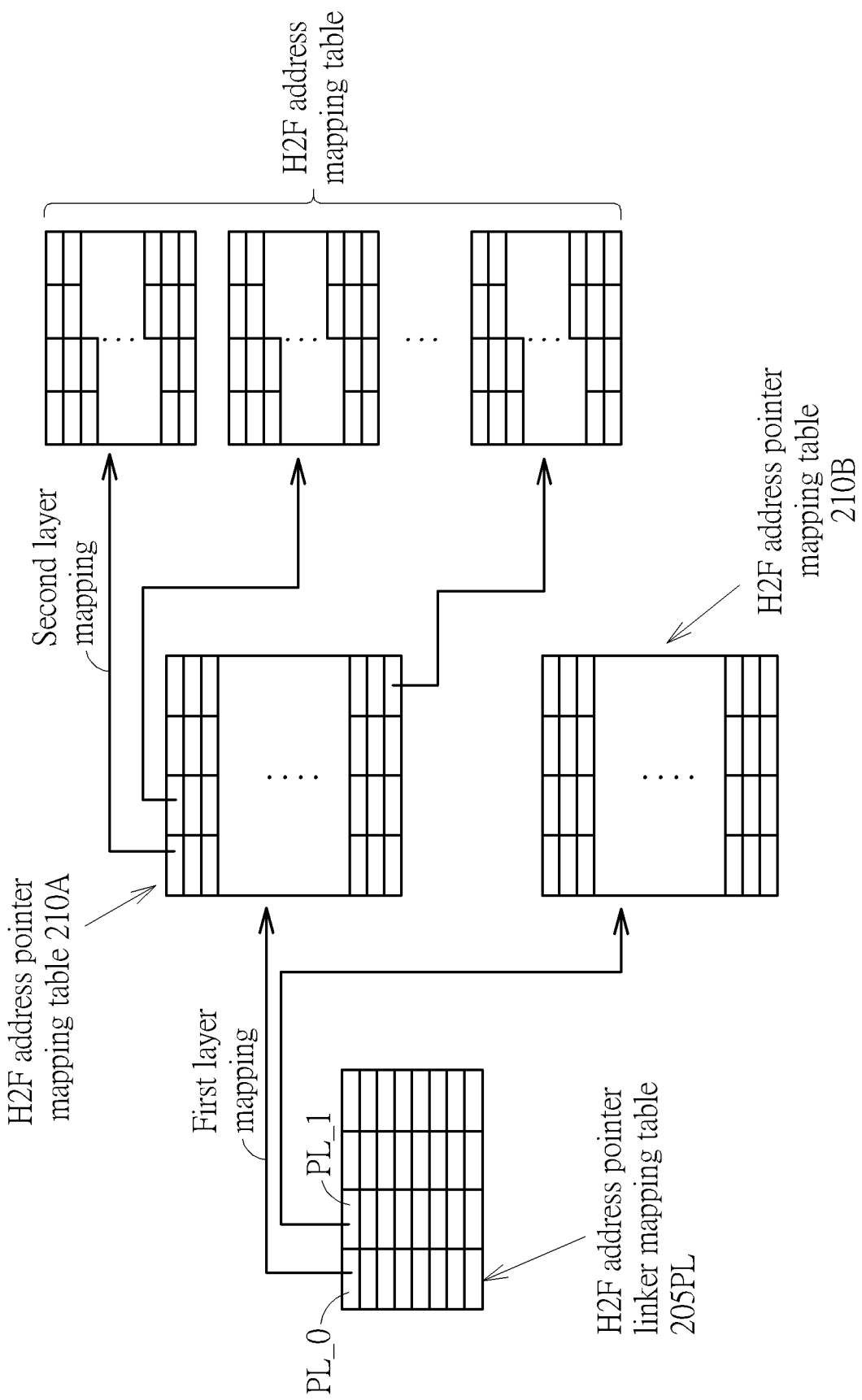
FIG. 2 is a diagram of a two-layer address mapping operation of a flash memory controller according to an embodiment of the invention.

Please refer to FIG. 2. FIG. 2 is a diagram of the two-layer address mapping operation of the flash memory controller 105 (or the processing circuit 1051) as shown in FIG. 1 according to an embodiment of the invention. As shown in FIG. 2, one H2F address pointer linker mapping table 205PL comprises multiple H2F address pointer linkers PL_0-PL_N, and the number N for example is equal to 31 to indicate the total number of H2F address pointer linkers is equal to 32. Each H2F address pointer linkers PL_0-PL_N respectively point to different H2F address pointer mapping tables. For example, in FIG. 2, a first H2F address pointer linker PL_0 points to one H2F address pointer mapping table 210A, and a second H2F address pointer linker PL_1 points to another different H2F address pointer mapping table 210B. If the storage memory space of the flash memory 110 totally needs 256K address mapping tables, i.e. it totally needs 256K address pointers to respectively point to the address mapping tables, then an H2F address pointer linker can be configured to correspond to address pointers having the number of 8K since the value 256K divided by 32 is equal to 8K. Accordingly, an H2F address pointer mapping table pointed by an H2F address pointer linker comprises 8K address pointers which respectively point to 8K different address mapping tables.

Figure 3:
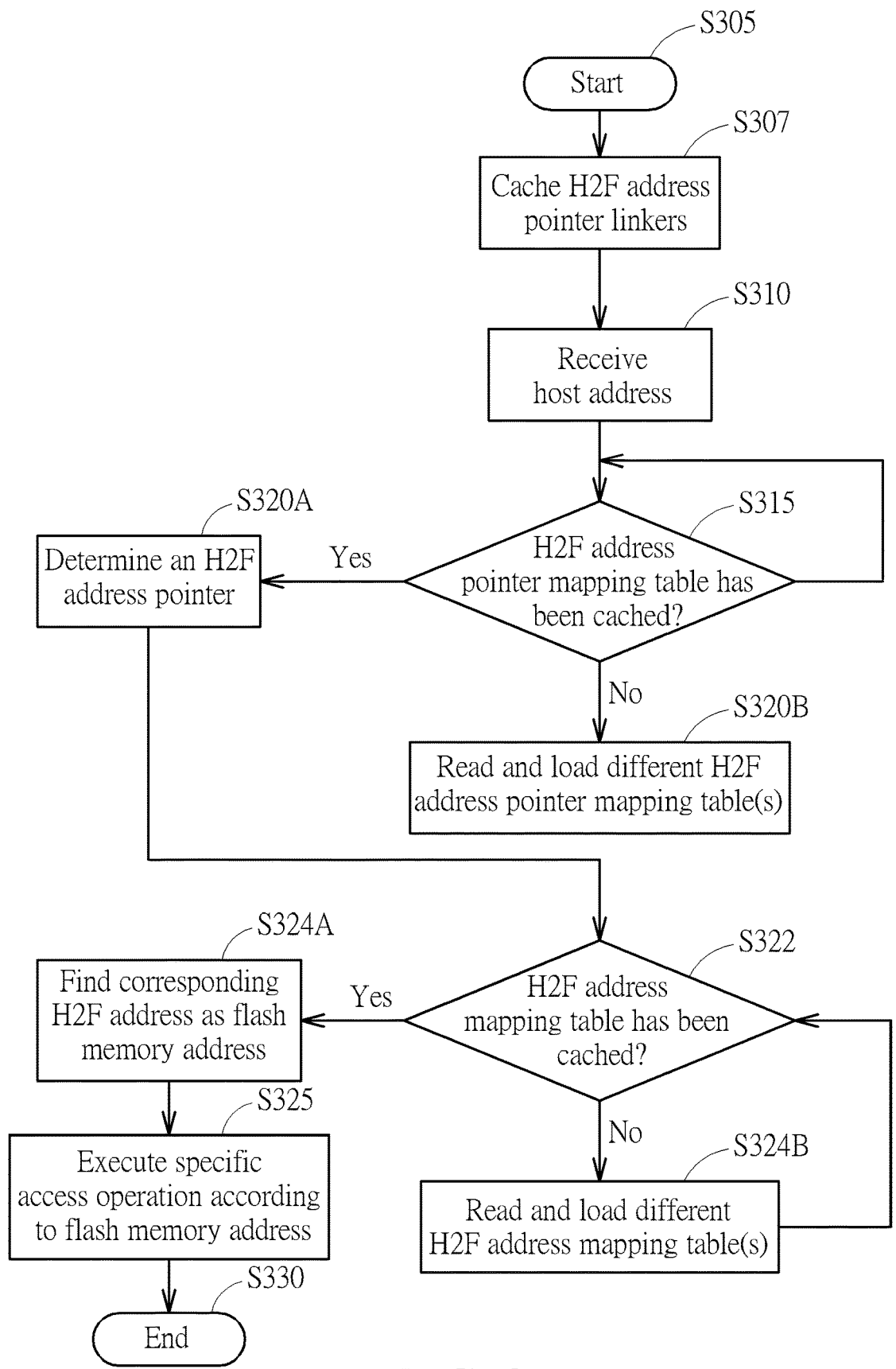
FIG. 3 is a flowchart diagram of the flash memory controller using the two-layer address mapping operation to map a host address into a flash memory address according to an embodiment of the invention.

To make readers more clearly understand the spirits of the invention, FIG. 3 is provided. FIG. 3 is a flowchart diagram of the flash memory controller 105 (or the processing circuit 1051) mapping a host address into a flash memory address by using the two-layer address mapping operation according to one embodiment of the invention. Descriptions of the steps are detailed in the following:

Step S305: Start;

Step S307: The cache space of time sharing buffer 105 of flash memory controller 105 initially is used to cache and temporarily store the H2F address pointer linkers having the number N as its resident data without storing the address pointer mapping tables and without storing the address mapping tables;

Step S310: The flash memory controller 105 receives a host address, i.e. a logical address;

Step S315: The flash memory controller 105 determines whether an H2F address pointer mapping table pointed by an H2F address pointer linker corresponding to the host address has been cached in the cache space of the flash memory controller 105 according to the address information of the host address; if the corresponding H2F address pointer mapping table has been cached in the cache space, then the flow proceeds Step S320A, otherwise (i.e. the corresponding H2F address pointer mapping table has not yet been cached in the cache space), the flow proceeds Step S320B;

Step S320A: The flash memory controller 105 determines an H2F address pointer from the H2F address pointer mapping table according to the information of the H2F address pointer mapping table which has been cached in the cache space;

Step S320B: The flash memory controller 105 reads and loads the information of different H2F address pointer mapping table(s) corresponding to other H2F address pointer linker(s) from the flash memory 110 into the cache space;

Step S322: The flash memory controller 105 determines whether an H2F address mapping table pointed by the H2F address pointer has been cached in the cache space of the flash memory controller 105 according to the address information of the host address; if the corresponding H2F address mapping table has been cached in the cache space, then the flow proceeds Step S324A; otherwise, if the corresponding H2F address mapping table has not yet been cached in the cache space, then the flow proceeds Step S324B;

Step S324A: The flash memory controller 105 finds a corresponding H2F address from the H2F address mapping table cached in the cache space according to the information of the logical address as the mapped flash memory address (i.e. a physical address);

Step S324B: The flash memory controller 105 reads and loads the information of the different H2F address mapping table(s) pointed by other H2F address pointer(s) from the flash memory 110 into the cache space;

Step S325: The flash memory controller 105 executes a specific access operation such as a read operation according to the flash memory address; and Step S330: End.

As mentioned above, before determining a specific address pointer linker corresponding to a specific host address, the time sharing buffer 1052 merely caches and temporarily stores the information the N address pointer linkers of the address pointer linker mapping table 205PL without storing corresponding address pointer mapping table(s) and without storing corresponding address mapping table(s). Additionally, after a host address has been successfully mapped into a flash memory address, when receiving another host address from the host device 101 wherein the another host address also corresponds to the specific address pointer linker, the corresponding address pointer mapping table, and the corresponding address mapping table, the processing circuit 1051 may determines another flash memory address directly according to the specific address pointer linker, the corresponding address pointer mapping table, and the corresponding address mapping table cached in the cache space of the time sharing buffer 1052 so as to execute another access operation according to the found another flash memory address without reading and loading the corresponding address pointer mapping table and the corresponding address mapping table from the flash memory 110 again. Alternatively, in one embodiment, after a host address has been successfully mapped into a flash memory address, when the processing circuit 1051 receives another host address from the host device 101 wherein the another host address corresponds to the specific address pointer linker, the corresponding address pointer mapping table, an another address mapping table, the processing circuit 1051 determines another pointer directly according to the specific address pointer linker and the corresponding address pointer mapping table cached in the cache space of the time sharing buffer 1052, then reads and load the another address mapping table from the flash memory 110 according to the address information pointed by the another pointer, and determines another flash memory address from the another address mapping table according to the found another flash memory address to perform another access operation without reading and loading the corresponding address pointer mapping table from the flash memory 110. Alternatively, in one embodiment, after a host address has been successfully mapped into a flash memory address, when the processing circuit 1051 receives another host address from the host device 101 wherein the another host address respectively corresponds to another specific address pointer linker, another address pointer mapping table, and another address mapping table, the processing circuit 1051 may read and load the information of the another address pointer mapping table from the flash memory 110 into the cache space of the specific buffer according to the address information pointed by the another specific address pointer linker, then read and load the information of the another address mapping table from the flash memory 110 into the cache space of the specific buffer according to the address information pointed by another pointer corresponding to the another host address in the another address pointer mapping table, and then determine another flash memory address from the another address mapping table to execute another access operation according to the found another flash memory address.

For example (but not limited), in one embodiment, an logical address mentioned above for example is a logical block address (LBA) and is indicated by a corresponding hexadecimal value; for instance, the hexadecimal value of the LBA address may be 0x7480_6EA4. The flash memory controller 105 divides the hexadecimal value of the LBA address by a hexadecimal value of the memory size corresponding to one divided portion to obtain a quotient and a remainder. For example, in this example, the flash memory controller 105 divides the hexadecimal value 0x7480_6EA4 of the LBA address by the hexadecimal value (e.g. 0x4000_0000 corresponding to the memory space size 512 GB) of one divided portion to obtain that the value of a first quotient is 1 and the value of a first remainder is 0x3480_6EA4. Thus, based on that the value of the first quotient is 1, the flash memory controller 105 can determine that the LBA address 0x7480_6EA4 corresponds to the first H2F address pointer linker, and then based on the physical address pointed by the information of the first H2F address pointer linker the flash memory controller 105 can read and load one H2F address pointer mapping table corresponding to the first H2F address pointer linker from the flash memory 110 into the cache space of the flash memory controller 105. Then, the flash memory controller 105 divides the hexadecimal value 0x3480_6EA4 of first remainder by the hexadecimal value of a physical address memory space size which can be mapped by one H2F address mapping table, e.g. 0x0002_0000 corresponding to the physical address memory space size 64 MB, to obtain that the hexadecimal value of a second quotient is 0x1A40 and the hexadecimal value of a second remainder is 0x0000_06EA4. Then, based on the hexadecimal value 0x0000_06EA4 of the obtained second remainder, the flash memory controller 105 can determine that the LBA address corresponds to an H2F address pointer having a serial number 0x1A40 in the H2F address pointer mapping table. If one storage page includes eight sectors, then the flash memory controller 105 is arranged to divide the hexadecimal value 0x0000_06EA4 of the obtained second remainder by eight to obtain a third quotient which is equal to 0x0DD4. By doing so, based on the first quotient (e.g. 1) and first remainder (e.g. 0x3480_6EA4) obtained by the first division operation/calculation, the second quotient (e.g. 0x1A40) and second remainder (e.g. 0x0000_06EA4) obtained by the second division operation/calculation, and the third quotient (e.g. 0x0DD4) obtained by the third division operation/calculation, the flash memory controller can correctly determine that the storage data (e.g. page data) of the hexadecimal value 0x7480_6EA4 of the LBA address is located at a storage page having a serial number 0xDD4 in one block pointed by the H2F address pointer having a serial number 0x1A40 in an H2F address pointer mapping table corresponding to the first H2F address pointer linker having a serial number 1. That is, the first H2F address pointer linker having the serial number 1 points to the first H2F address pointer mapping table having a serial number 1, and the H2F address pointer having the serial number 0x1A40 points to the physical address recorded in the field having the serial number 0x1A40 in one H2F address mapping table.

By using the two-layer mapping as shown in FIG. 2 (i.e. the mapping relation pointed by one H2F address pointer linker and the mapping relation pointed by one H2F address pointer) with simple/uncomplicated reading, loading, and division operations, the flash memory controller 105 can correctly map an LBA address into a physical address so as to find and obtain the storage data recorded at the physical address in the flash memory 110, and it is not needed for the flash memory controller 105 to record and store all the information of all the address mapping relations into a cache space having a limited space size. For the performance, the multi-layer address mapping technical solution provided in the invention can use a smaller cache space of the flash memory controller as well as support a larger size of flash memory capacity, and can also maintain the speed of the access operation.

In other embodiments, the flash memory controller 105 cam also employ two-layer above (e.g. three-layer, four-layer, or above) address mapping technical solution to support a very larger flash memory address space, and the operations are similar to those mentioned in the above paragraphs and are not detailed for brevity.

Further, in other embodiments, the flash memory controller 105 can also employ the multi-layer address mapping operations similar to those shown in FIG. 2 to convert a physical address into a logical address, and this modification also fall within the scope of the invention.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A flash memory controller, coupled between a host device and a flash memory, comprising:
a specific buffer, for allocating a cache space to cache and temporarily store data stored by the flash memory externally coupled to the flash memory controller; and
a processing circuit, coupled to the specific buffer, for receiving a specific host address from the host device, reading and loading a corresponding address pointer mapping table from the flash memory into the cache space of the specific buffer according to address information pointed by a specific address pointer linker corresponding to the specific host address, determining a specific address pointer corresponding to the specific host address from the corresponding address pointer mapping table according to the specific host address, reading and loading a corresponding address mapping table from the flash memory into the cache space of the specific buffer according to address information pointed by the specific address pointer, and for finding and obtaining a specific flash memory address from the corresponding address mapping table according to the specific host address so as to perform an access operation according to the found specific flash memory address;
wherein the processing circuit employs an address pointer linker mapping table having N address pointer linkers, the address pointer linker mapping table is resident and stored in the cache space of the specific buffer, the N address pointer linkers respectively correspond to N portions of a memory space allocated by the flash memory, and the processing circuit determines the specific address pointer linker corresponding to the specific host address from the N address pointer linkers temporarily stored by the specific buffer.

2. The flash memory controller of claim 1, wherein before determining the specific address pointer linker corresponding to the specific host address, the specific buffer merely caches and temporarily stores the N address pointer linkers of the address pointer linker mapping table without storing the corresponding address pointer mapping table and without storing the corresponding address mapping table.

3. The flash memory controller of claim 1, wherein when the processing circuit receives another host address from the host device and the another host address also corresponds to the specific address pointer linker, the corresponding address pointer mapping table, and the corresponding address mapping table, the processing circuit determines another flash memory address directly according to the specific address pointer linker temporarily stored by the cache space of the specific buffer, the corresponding address pointer mapping table, and the corresponding address mapping table, and then the processing circuit performs another access operation according the found another flash memory address without reading and loading the corresponding address pointer mapping table and the corresponding address mapping table from the flash memory.

4. The flash memory controller of claim 1, wherein when the processing circuit receives another host address from the host device and the another host address corresponds to the specific address pointer linker, the corresponding address pointer mapping table, and another address mapping table, the processing circuit determines another pointer directly according to the specific address pointer linker buffered by the cache space of the specific buffer and the corresponding address pointer mapping table, reading and loading the another address mapping table from the flash memory according to address information pointed by the another pointer, and determining another flash memory address from the another address mapping table to perform another access operation according to the found another flash memory address without reading and loading the corresponding address pointer mapping table from the flash memory.

5. The flash memory controller of claim 1, wherein when the processing circuit receives another host address from the host device and the another host address respectively corresponds to another specific address pointer linker, another address pointer mapping table, and another address mapping table, the processing circuit reads and loads information of the another address pointer mapping table from the flash memory into the cache space of the specific buffer according to address information pointed by the another specific address pointer linker, reading and loading information of the another address mapping table from the flash memory into the cache space of the specific buffer according to address information pointed by another pointer corresponding the another host address in the another address pointer mapping table, and determining another flash memory address from the another address mapping table to perform another access operation according the found another flash memory address.

6. The flash memory controller of claim 1, wherein the specific host address is a logical block address, and the processing circuit divides a hexadecimal value of the logical block address by a hexadecimal value of a memory space size corresponding to a portion so as to calculate and obtain a first quotient and then determines the specific address pointer linker from the N address pointer linkers according to the first quotient.

7. The flash memory controller of claim 6, wherein the processing circuit divides the hexadecimal value of the logical block address by the hexadecimal value of the memory space size corresponding to the portion so as to derive a first remainder, then divides the first remainder by a hexadecimal value of a physical address memory space size mapped by an address mapping table so as to generate a second quotient, and determines the specific address pointer corresponding to the specific host address from the corresponding address pointer mapping table according to the second quotient.

8. The flash memory controller of claim 7, wherein the processing circuit divides the first remainder by the hexadecimal value of the physical address memory space size mapped by the address mapping table to generate a second remainder, divides the second remainder by a total number of sectors included by a storage page to generate a third quotient, and determines the specific flash memory address corresponding to the specific host address from the corresponding address mapping table according to the third quotient.

9. An address mapping method used by a flash memory controller which is to be coupled between a host device and a flash memory, comprising:
providing a specific buffer to allocate a cache space to cache and temporarily store data stored by the flash memory which is externally coupled to the flash memory controller;
providing a processing circuit coupled to the specific buffer;
using the processing circuit to receive a specific host address from the host device;
reading and loading a corresponding address pointer mapping table from the flash memory into the cache space of the specific buffer according to address information pointed by a specific address pointer linker corresponding to the specific host address;
determining a specific address pointer corresponding to the specific host address from the corresponding address pointer mapping table according to the specific host address;
reading and loading a corresponding address mapping table from the flash memory into the cache space of the specific buffer according to address information pointed by the specific address pointer;
finding and obtaining a specific flash memory address from the corresponding address mapping table according to the specific host address so as to perform an access operation according to the found specific flash memory address;
employing an address pointer linker mapping table having N address pointer linkers, the address pointer linker mapping table being resident and stored in the cache space of the specific buffer, the N address pointer linkers respectively corresponding to N portions of a memory space allocated by the flash memory; and
using the processing circuit to determine the specific address pointer linker corresponding to the specific host address from the N address pointer linkers temporarily stored by the specific buffer.

10. The address mapping method of claim 9, further comprising
before determining the specific address pointer linker corresponding to the specific host address, using the specific buffer to merely cache and temporarily store the N address pointer linkers of the address pointer linker mapping table without storing the corresponding address pointer mapping table and without storing the corresponding address mapping table.

11. The address mapping method of claim 9, further comprising:
when the processing circuit receives another host address from the host device and the another host address also corresponds to the specific address pointer linker, the corresponding address pointer mapping table, and the corresponding address mapping table, using the processing circuit to determine another flash memory address directly according to the specific address pointer linker temporarily stored by the cache space of the specific buffer, the corresponding address pointer mapping table, and the corresponding address mapping table so as to perform another access operation according the found another flash memory address without reading and loading the corresponding address pointer mapping table and the corresponding address mapping table from the flash memory.

12. The address mapping method of claim 9, further comprising:
when the processing circuit receives another host address from the host device and the another host address corresponds to the specific address pointer linker, the corresponding address pointer mapping table, and another address mapping table, using the processing circuit to determine another pointer directly according to the specific address pointer linker buffered by the cache space of the specific buffer and the corresponding address pointer mapping table, to read and load the another address mapping table from the flash memory according to address information pointed by the another pointer, and to determine another flash memory address from the another address mapping table to perform another access operation according to the found another flash memory address without reading and loading the corresponding address pointer mapping table from the flash memory.

13. The address mapping method of claim 9, further comprising:
when the processing circuit receives another host address from the host device and the another host address respectively corresponds to another specific address pointer linker, another address pointer mapping table, and another address mapping table, using the processing circuit to read and load information of the another address pointer mapping table from the flash memory into the cache space of the specific buffer according to address information pointed by the another specific address pointer linker, to read and load information of the another address mapping table from the flash memory into the cache space of the specific buffer according to address information pointed by another pointer corresponding the another host address in the another address pointer mapping table, and to determine another flash memory address from the another address mapping table to perform another access operation according the found another flash memory address.

14. The address mapping method of claim 9, wherein the specific host address is a logical block address, and the address mapping method comprises:
   using the processing circuit to divide a hexadecimal value of the logical block address by a hexadecimal value of a memory space size corresponding to a portion so as to calculate and obtain a first quotient and then determines the specific address pointer linker from the N address pointer linkers according to the first quotient.

15. The address mapping method of claim 14, further comprising:
   using the processing circuit to divide the hexadecimal value of the logical block address by the hexadecimal value of the memory space size corresponding to the portion so as to derive a first remainder, then to divide the first remainder by a hexadecimal value of a physical address memory space size mapped by an address mapping table so as to generate a second quotient, and to determine the specific address pointer corresponding to the specific host address from the corresponding address pointer mapping table according to the second quotient.

16. The address mapping method of claim 15, further comprising:
   using the processing circuit to divide the first remainder by the hexadecimal value of the physical address memory space size mapped by the address mapping table to generate a second remainder, to divide the second remainder by a total number of sectors included by a storage page to generate a third quotient, and to determine the specific flash memory address corresponding to the specific host address from the corresponding address mapping table according to the third quotient.

17. A storage device coupled to a host device, comprising:
a flash memory; and
a flash memory controller, coupled between the host device and the flash memory, comprising:
   a time sharing buffer, for allocating a cache space to cache and temporarily store data stored by the flash memory; and
   a processing circuit, coupled to the time sharing buffer, for:
      receiving a specific host address from the host device;
      reading and loading a corresponding address pointer mapping table from the flash memory into the cache space of the time sharing buffer according to address information pointed by a specific address pointer linker corresponding to the specific host address;
      determining a specific address pointer corresponding to the specific host address from the corresponding address pointer mapping table according to the specific host address;
      reading and loading a corresponding address mapping table from the flash memory into the cache space of the time sharing buffer according to address information pointed by the specific address pointer; and
      finding and obtaining a specific flash memory address from the corresponding address mapping table according to the specific host address so as to perform a read operation according to the found specific flash memory address;
      wherein the flash memory controller employs an address pointer linker mapping table including N address pointer linkers, the address pointer linker mapping table is resident and temporarily stored by the cache space of the time sharing buffer, the N address pointer linkers respectively correspond to N portions of a memory space allocated by the flash memory, and the flash memory controller determines the specific address pointer linker corresponding to the specific host address from the address pointer linkers temporarily stored by the time sharing buffer.

* * * * *